United States Patent
Astrachan (10) Patent No.: US 7,400,869 B2
(45) Date of Patent: Jul. 15, 2008

(54) SYSTEM AND METHOD FOR ADAPTIVE DC OFFSET COMPENSATION IN WIRELESS TRANSMISSIONS

(75) Inventor: Paul M. Astrachan, Austin, TX (US)

(73) Assignee: ViXS Systems Inc., Toronto, Ontario (CA)

( * ) Notice: Subject to any disclaimer, the term of this patent is extended or adjusted under 35 U.S.C. 154(b) by 420 days.

(21) Appl. No.: 11/086,869

(22) Filed: Mar. 22, 2005

(65) Prior Publication Data

US 2006/0217100 A1    Sep. 28, 2006

(51) Int. Cl.
H04B 1/06    (2006.01)
H04B 1/26    (2006.01)

(52) U.S. Cl. .................................. 455/240.1; 455/296

(58) Field of Classification Search ............... 455/232.1, 455/234.1, 234.2, 240.1, 296, 324
See application file for complete search history.

(56) References Cited

U.S. PATENT DOCUMENTS

| | | | |
|---|---|---|---|
| 4,866,395 A | 9/1989 | Hosteller |
| 5,027,203 A | 6/1991 | Samad et al. |
| 5,093,847 A | 3/1992 | Cheng |
| 5,115,812 A | 5/1992 | Sano et al. |
| 5,253,056 A | 10/1993 | Puri |
| 5,475,434 A | 12/1995 | Kim |
| 5,563,950 A | 10/1996 | Easter et al. |
| 5,602,589 A | 2/1997 | Vishwanath et al. |
| 5,635,985 A | 6/1997 | Boyce et al. |
| 5,644,361 A | 7/1997 | Ran et al. |
| 5,652,749 A | 7/1997 | Davenport et al. |
| 5,732,391 A | 3/1998 | Fiocca |
| 5,737,020 A | 4/1998 | Hall et al. |
| 5,740,028 A | 4/1998 | Sugiyama et al. |
| 5,844,545 A | 12/1998 | Suzuki et al. |
| 5,850,443 A | 12/1998 | Van Oorschot et al. |
| 5,940,130 A | 8/1999 | Nilsson et al. |
| 5,996,029 A | 11/1999 | Sugiyama et al. |

(Continued)

FOREIGN PATENT DOCUMENTS

EP    0661826 A2    7/1995

(Continued)

OTHER PUBLICATIONS

Yu, Donghoom, et al., "Fast Motion Estimation for Shape Coding in MPEG-4," IEEE Transactions on Circuits and Systems for Video Technology, vol. 13, No. 4, 2003 IEEE, Apr. 2003, pp. 358-363.

(Continued)

Primary Examiner—Lee Nguyen (57) ABSTRACT

A first direct current (DC) component of a first amplified representation of a received signal at an output of an amplifier set to a first gain setting is determined during a first expected idle period of a received signal. A second DC component of a second amplified representation of the received signal at the output of the amplifier set to the first gain setting is determined during a second expected idle period of the received signal. A first average DC component is determined based at least in part on the first and second DC components and a DC offset used by the amplifier when set to the first gain setting is adjusted based on a comparison of the first average DC component to one or more threshold values.

16 Claims, 3 Drawing Sheets

U.S. PATENT DOCUMENTS

| | | | |
|---|---|---|---|
| 6,005,623 | A | 12/1999 | Takahashi et al. |
| 6,005,624 | A | 12/1999 | Vainsencher |
| 6,014,694 | A | 1/2000 | Aharoni et al. |
| 6,040,863 | A | 3/2000 | Kato |
| 6,081,295 | A | 6/2000 | Adolph et al. |
| 6,141,693 | A | 10/2000 | Perlman et al. |
| 6,144,402 | A | 11/2000 | Norsworthy et al. |
| 6,167,084 | A | 12/2000 | Wang et al. |
| 6,182,203 | B1 | 1/2001 | Simar, Jr. et al. |
| 6,215,821 | B1 | 4/2001 | Chen |
| 6,219,358 | B1 | 4/2001 | Pinder et al. |
| 6,222,886 | B1 | 4/2001 | Yogeshwar |
| 6,236,683 | B1 | 5/2001 | Mougeat et al. |
| 6,259,741 | B1 | 7/2001 | Chen et al. |
| 6,263,022 | B1 | 7/2001 | Chen et al. |
| 6,300,973 | B1 | 10/2001 | Feder et al. |
| 6,307,939 | B1 | 10/2001 | Vigarie |
| 6,314,138 | B1 | 11/2001 | Lemaguet |
| 6,323,904 | B1 | 11/2001 | Knee |
| 6,366,614 | B1 | 4/2002 | Pian et al. |
| 6,385,248 | B1 | 5/2002 | Pearlstein et al. |
| 6,438,168 | B2 | 8/2002 | Arye |
| 6,459,889 | B1* | 10/2002 | Ruelke .................. 455/296 |
| 6,480,541 | B1 | 11/2002 | Girod et al. |
| 6,526,099 | B1 | 2/2003 | Christopoulos et al. |
| 6,549,561 | B2 | 4/2003 | Crawford |
| 6,584,509 | B2 | 6/2003 | Putzolu |
| 6,714,202 | B2 | 3/2004 | Dorrell |
| 6,724,726 | B1 | 4/2004 | Coudreuse |
| 6,748,020 | B1 | 6/2004 | Eifrig et al. |
| 2001/0026591 | A1 | 10/2001 | Keren et al. |
| 2002/0106022 | A1 | 8/2002 | Takahashi et al. |
| 2002/0110193 | A1 | 8/2002 | Yoo et al. |
| 2002/0138259 | A1 | 9/2002 | Kawahara |
| 2002/0145931 | A1 | 10/2002 | Pitts |
| 2002/0196851 | A1 | 12/2002 | Arnaud |
| 2003/0093661 | A1 | 5/2003 | Loh et al. |
| 2003/0152148 | A1 | 8/2003 | Laksono |
| 2004/0053586 | A1* | 3/2004 | Simmons et al. ............ 455/130 |

FOREIGN PATENT DOCUMENTS

| | | | |
|---|---|---|---|
| EP | 0739138 | A2 | 10/1996 |
| EP | 0805599 | A2 | 11/1997 |
| EP | 0855805 | A2 | 7/1998 |
| EP | 0896300 | B1 | 2/1999 |
| EP | 0901285 | A1 | 2/1999 |
| EP | 0955607 | A2 | 11/1999 |
| EP | 1032214 | A2 | 8/2000 |
| EP | 1087625 | A2 | 3/2001 |
| JP | 07-210670 | A | 8/1995 |
| WO | WO 01/95633 | A2 | 12/2001 |
| WO | WO 02/080518 | A2 | 10/2002 |

OTHER PUBLICATIONS

Pyun, Jae-Young, "QoS Provisioning for Video Streaming Over IEEE 802.11 Wireless LAN," (abridged) IEEE Conferences in Consumer Electronics, Jun. 16, 2003, EE Times, Seoul, Korea, <http://eetimes.com/printableArticle?doc_id=OEG2003061S0070> retrieved Jul. 8, 2003.

Youn, Jeongnam et al., "Video Transcoding For Multiple Clients," Proceedings of the SPIE, Bellingham, VA, vol. 4067, XP008012075, pp. 76-85, University of Washington, Seattle, WA.

Lengwehasatit, Krisda et al.. "Computationally Scalable Partial Distance Based Fast Search Motion Estimation," Packet Video Corp., San Diego, CA.

Takahashi, Kuniaki, et al., "Motion Vector Synthesis Algorithm for MPEG2-to-MPEG4 Transoder," Proceedings of the SPIE, Bellingham, VA, vol. 4310, Sony Corporation, XP008000078, pp. 387-882, 2001 SPIE.

Soares, Luis Ducla, et al., "Influence of Encoder Parameters on the Decoded Video Quality for MPEG-4 Over W-CDMA Mobile Networks," NTT DoCoMo, Inc.

Aggarwal, Manoj et al., "Efficient Huffman Decoding," 2000 IEEE, 0-7803-6297-7, pp. 936-939, University of Illinois at Urbana-Champaign, Urbana, IL.

Sherwood, P. Greg et al., "Efficient Image and Channel Coding for Wireless Packet Networks,", University of California, La Jolla, California.

Assunco, Pedro et al., "Rate Reduction Techniques for MPEG-2 Video Bit Streams," SPIE, vol. 2952, Apr. 1996, pp. 450-459, University of Essex, Colchester, England.

Yin, Peng et al., "Video Transcoding by Reducing Spatial Resolution," Princeton University, 2000, Princeton, New Jersey.

Shanableh, Tamer et al., "Heterogeneous Video Transcoding to Lower Spatio-Temporal Resolutions and Difference Encoding Formats," IEEE Transactions on Multimedia, vol. 2, No. 2, Jun. 2000, pp. 101-110, Engineering and Physical Sciences Researc Counsel, Colchester, U.K.

Wiegand, Thomas et al., "Long-Term Memory Motion-Compensated Prediction for Rubust Video Trasmittion," In Proc. ICIP 2000, University of Erlangen-Buremberg. Erlangen, Germany.

Fan, Zhigang et al. "Maximum Likelihood Estimation of JPEG Quantization Table in the Identification of Bitmap Compression History," Xerox Corporation, Webster, New York.

Thomas, Shine M. et al., "An Efficient Implentation of MPEG-2 (BC1) Layer 1 & Layer 2 Stereo Encoder on Pentium-III Platform", pp. 1-10, Sasken Communication Technologies Limited, Bangalore, India.

Ramanujan, Ranga S. et al., "Adaptive Streaming of MPEG Video Over IP Networks," 22nd IEEE Conference on Local Computer Networks (LCN '97), Nov. 2-5, 1997, 1997 IEEE, pp. 398-409, Architecture Technology Corporation, Minneapolis, MN.

Rejaie, Reza et al., "Architectural Considerations for Playback of Quality Adaptive Video Over the Internet," XP002177090, 2000 IEEE pp. 204-209, AT&T Labs, Menlo Park, California.

Bouras, C. et al.,"On-Demand Hypermedia/Multimedia Service Over Broadband Networks," XP-002180545, 1996 IEEE Proceedings of HPDC-5 '96, pp. 224-230, University of Patras, Patras, Greece.

Chalidabhongse, Junavit et al., "Fast Motion Vector Estimation Using Multiresolution-Spatio-Temporal Correlations," IEEE Transactions On Circuits and Systems For Video Technology, vol. 7, No. 3 Jun. 1997, pp. 477-488.

Oh, Hwang-Seok et al., "Block-Matching Algorithm Based On An Adaptive Reduction of the Search Area For Motion Estimation," Real-Time Imaging, Academic Press Ltd., vol. 56, No. 5, Oct. 2000, pp. 407-414, XP004419498 ISSN: 1077-2014 , Taejon, Korea.

Lee, Liang-Wei et al., "Dynamic Search-Window Adjustment and Interlaced Search for Block-Matching Algorithm," IEEE Transactions On Circuits and Systems for Video Technology, IEEE, vol. 3, No. 1, Feb. 1993, pp. 85-87, XP000334581 ISSN: 1051-8215, New York.

Fukunaga, Shigeru et al., "MPEG-4 Video Verification Model Version 16.0" International Organization for Standardization: Coding of Moving Pictures and Audio, vol. N3312, Mar. 2000, pp. 1-380, XP000861688.

Kroner, Sabine et al., "Edge Preserving Noise Smoothing With An Optimized Cubic Filter," DEEI, University of Trieste, Trieste, Italy.

Kim, Jaemin et al., "Spatiotemporal Adaptive 3-D Kalman Filter for Video," pp. 1-12. Samsung Semiconductor, Inc. San Jose, California.

Liu, Julia J., "ECE497KJ Course Project: Applications of Wiener Filtering In Image and Video De-Noising," pp. 1-15, May 21, 1997.

Jostschulte, K. et al., "A Subband Based Spatio-Temporal Noise Reduction Technique for Interlaced Video Signals," University Dortmund, Dortmund, Germany.

Kossentini, Faouzi et al. "Predictive RD Optimized Motion Estimation for Very Low Bit-Rate Video Coding," 1997 IEEE, XP-000726013, pp. 1752-1963, Sep. 1, 1996, 1997 International Conference on Image Processing, Vancouver, Canada.

Tourapis, Alexis et al. "New Results on Zonal Based Motion Algorithms—Advanced Predictive Diamond Zonal Search," 2001

IEEE, pp. V 183-V 186, The Hong Kong University of Science and Technology, Clear Water Bay, Kowloon, Hong Kong.

Brandenburg, Karlheinz, "MP3 and AAC Explained," Proccedings of AES 17th International Conference, XP008004053, pp. 99-110, Erlangen, Germany.

Painter, Ted et al., "Perceptual Coding of Digital Audio," Proceedings of the IEEE, vol. 88, No. 4, Apr. 2000, pp. 451-513, XP001143231, ISSN: 0018-9219, Arizona State University, Tempe, AZ.

Hassanzadegan, Hooman et al., "A New Method for Clock Recovery in MPEG Decoders," pp. 1-8, Basamad Negar Company, Tehran, Iran.

Kan, Kou-Sou et al., "Low-Complexity and Low-Delay Video Transcoding for Compressed MPEG-2 Bitstream," Natinal Central University, Chung-Li, Taiwan.

Mitchell et al., "MPEG Video Compression Standard: 15.2 Encoder and Decorder Buffering," Chapman and Hall Digital Multimedia Standards Series, pp. 340-356, XP002115299, ISBN: 0-412-08771-5, Chapman and Hall, New York.

WhyBray, M.W. et al., "Video Coding—Techniques, Standards and Applications," BT Technol J. vol. 14, No. 4, Oct. 4, 1997, pp. 86-100, XP000722036.

"SHARP Product Information: VTST-Series NTSC/PAL Electronic Television Tuners," RF Components Group, Sharp Microelectronics of the America, 1997.

Edwards, Larry M., "Satisfying Your Need for Net Speed," San Diego Metropolitan, Sep. 1999, <<www.sandiegometro.com/1999/sept/speed.html>>, retrieved on Jul. 19, 2001.

Oz, Ran et al., "Unified Headend Technical Management of Digital Services," BigBend Networks, Inc.

Muriel, Chris, "What is Digital Satellite Television?," What is Digital Television Rev. 3.0, Apr. 21, 1999, SatCure, Sandbach, England, <<http://www.netcentral.co.uk/satcure/digifaq.htm>>, access on Apr. 20, 2001.

"CONEXANT Products & Tech Info: Product Briefs: CX24108," 2000-2002 Conexant Systems, Inc. access on Apr. 20, 2001.

"CONEXANT Products & Tech Info: Product Briefs: CX22702," 2000-2002 Conexant Systems, Inc, access on Apr. 20, 2001.

"TDC: Components for Modems & Digital Infotainment: Direct Broadcast Satellite Chipset," 2001 Telecom Design Communications Ltd., U.K., <<http://www.tdc.co.uk/modmulti/settop/index.htm>>, access on Apr. 20, 2001.

"White Paper: Super G: Maximizing Wireless Performance," Mar. 2004, Atheros Communications, Inc., pp. 1-20, Document No. 991-00006-001, Sunnyvale, California.

Kwok, Y.K. et al., "Efficient Multiple Access Control Using a Channel-Adaptive Protocol for a Wireless ATM-Based Multimedia Services Network," Mar. 29, 2000, Computer Communications 24(2001) 970-983, University of Hong Kong, Hong Kong, PRC.

Liang, Ying-Chang et al., "Joint Downlink Beamforming, Power Control, and Data Rate Allocation for DS-CDMA Mobile Radio with Multimedia Services," 2000 IEEE, pp. 1455-1457, Ceneter for Wireless Communication, Singapore.

Razavi, Behzad, "Challenges in Portable RF Transceiver Design," Sep. 1996, 1996 IEEE, pp. 12-25, Circuits & Devices.

Mannion, Patrick, "IceFyre Device Cools 802.11a Power Consumption," Sep. 24, 2001, Planet Analog, National Semiconductor, <<http://www.planetanalog.com/story/OEG20010924S0079>>, access on Nov. 5, 2001.

"ICE Fyre Semiconductor: IceFyre 5-GHz OFDM Modem Solution," Sep. 2001, pp. 1-6, IceFyre: Rethink Wireless, IceFyre Semiconductor, Inc.

Pozar, David M., "Theory and Design of Ferrimagnetic Components," pp. 529, Microwave Engineering, Addison-Wesley Publishing Company, Inc.

"Part 11: Wireless LAN Medium Access Control (MAC) and Physical Layer (PHY) Specifications: High-Speed Physical Layer in the 5 GHz Band," 1999 IEEE, pp. 1-83, Supplement to IEEE Standard for rInformation Technology, IEEE Std 802.11a-1999, LAN/MAN Standards Committee.

Ciciora, Walter S., "Cable Television in the United States: An Overwiew," May 25, 1995, pp. 1-90, Cable Television Laboratories, Inc., Louisville, Colorado.

* cited by examiner

SYSTEM AND METHOD FOR ADAPTIVE DC OFFSET COMPENSATION IN WIRELESS TRANSMISSIONS

FIELD OF THE DISCLOSURE

The present disclosure relates to the compensation of direct current (DC) components in transmitted signals.

BACKGROUND

The wireless transmission of a signal representative of information in accordance with one or more wireless protocols (i.e., IEEE 802.11x, 3G, etc.) typically entails formatting the signal at the transmitting device, modulating the formatted signal over a baseband carrier, receiving the modulated signal at the receiving device and demodulating the modulated signal, whereupon the received signal may be processed further by the receiving device.

The formatted signal typically is modulated over a baseband carrier so that the resulting signal ideally would have a relatively small direct current (DC) component, if any. However, as a result of noise present in the transmission environment and/or changes in the characteristics of the transmitting equipment (resulting from, for example, heat in the components of the transmitting device), a significant DC component may be present in the received signal. Similarly, the components of the receiving device also may introduce a significant DC component into the received signal as it is processed.

A number of techniques have been developed to reduce or minimize the DC component in the received signal. One conventional technique utilizes a training period at start-up whereupon the DC component in the received signal is measured for one or more gain settings. After the initial training period, the receiving device uses a fixed DC offset associated with the initial measured DC component for the particular gain setting. However, it will be appreciated that the DC component present in the received signal for any given gain setting typically varies over time due to any of a variety of factors, such as the operating temperature of the components of the transmitting device or receiving device, noise in the transmission environment, and the like. Accordingly, the use of a fixed DC offset may not adequately compensate for the DC component of the received signal as the DC component of the received signal varies from the value originally measured during the initial training period. Other conventional techniques measure the DC offset on each burst during the training for the bust. However, these techniques typically require considerable hardware to perform this training, which increases both the complexity, cost and power consumption of those devices utilizing such techniques. Accordingly, an adaptive technique for compensating for a varying DC component in a received wireless signal would be advantageous.

BRIEF DESCRIPTION OF THE DRAWINGS

The purpose and advantages of the present disclosure will be apparent to those of ordinary skill in the art from the following detailed description in conjunction with the appended drawings in which like reference characters are used to indicate like elements, and in which.

DETAILED DESCRIPTION OF THE DISCLOSURE

The following description is intended to convey a thorough understanding of the present disclosure by providing a number of specific embodiments and details involving adaptive DC offset compensation in wireless systems. It is understood, however, that the present disclosure is not limited to these specific embodiments and details, which are exemplary only. It is further understood that one possessing ordinary skill in the art, in light of known systems and methods, would appreciate the use of the disclosure for its intended purposes and benefits in any number of alternative embodiments, depending upon specific design and other needs.

Figure 1:
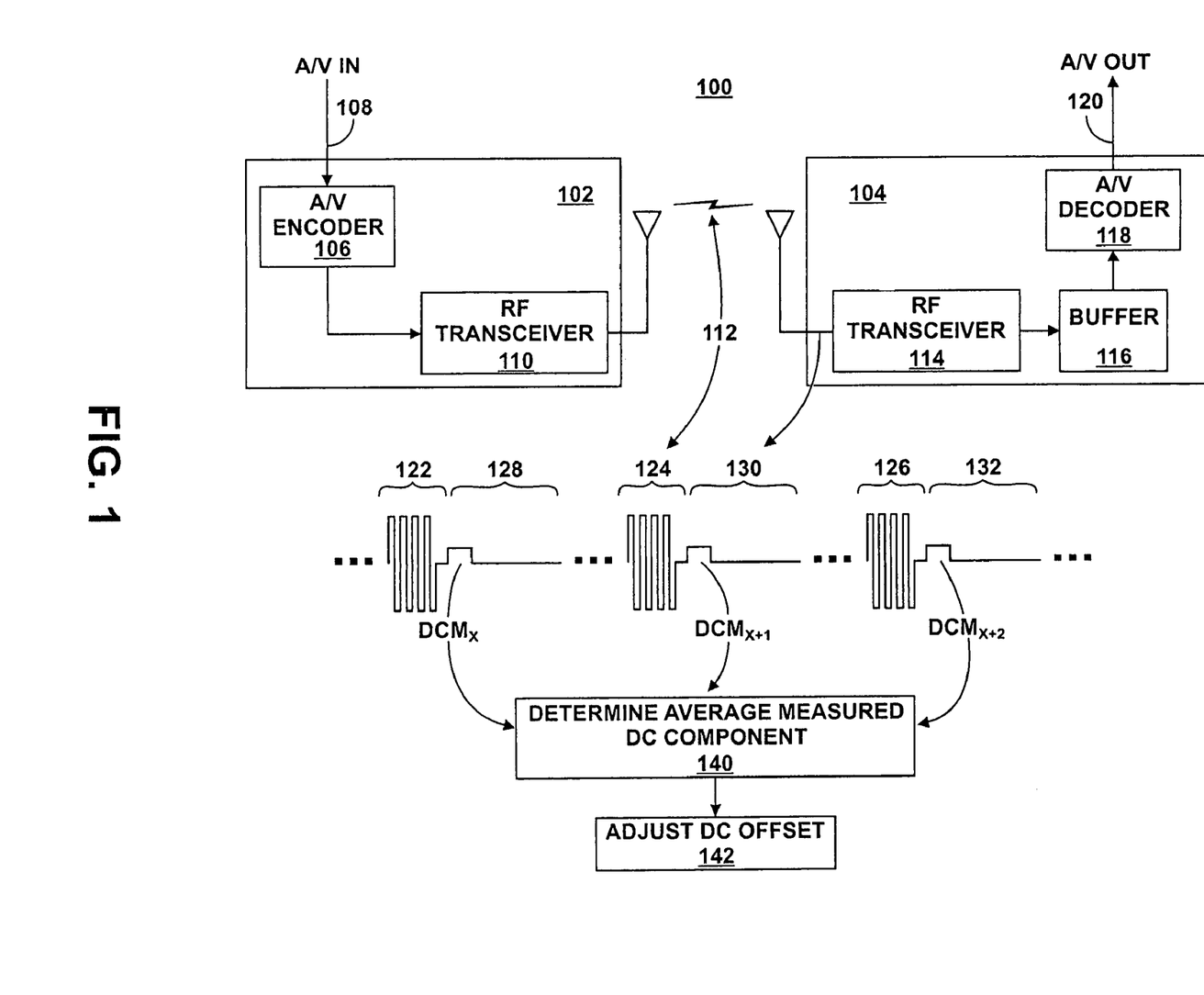
FIG. 1 is a block diagram of an exemplary wireless system utilizing an adaptive DC offset compensation technique in accordance with at least one embodiment of the present disclosure.
Figure 2:
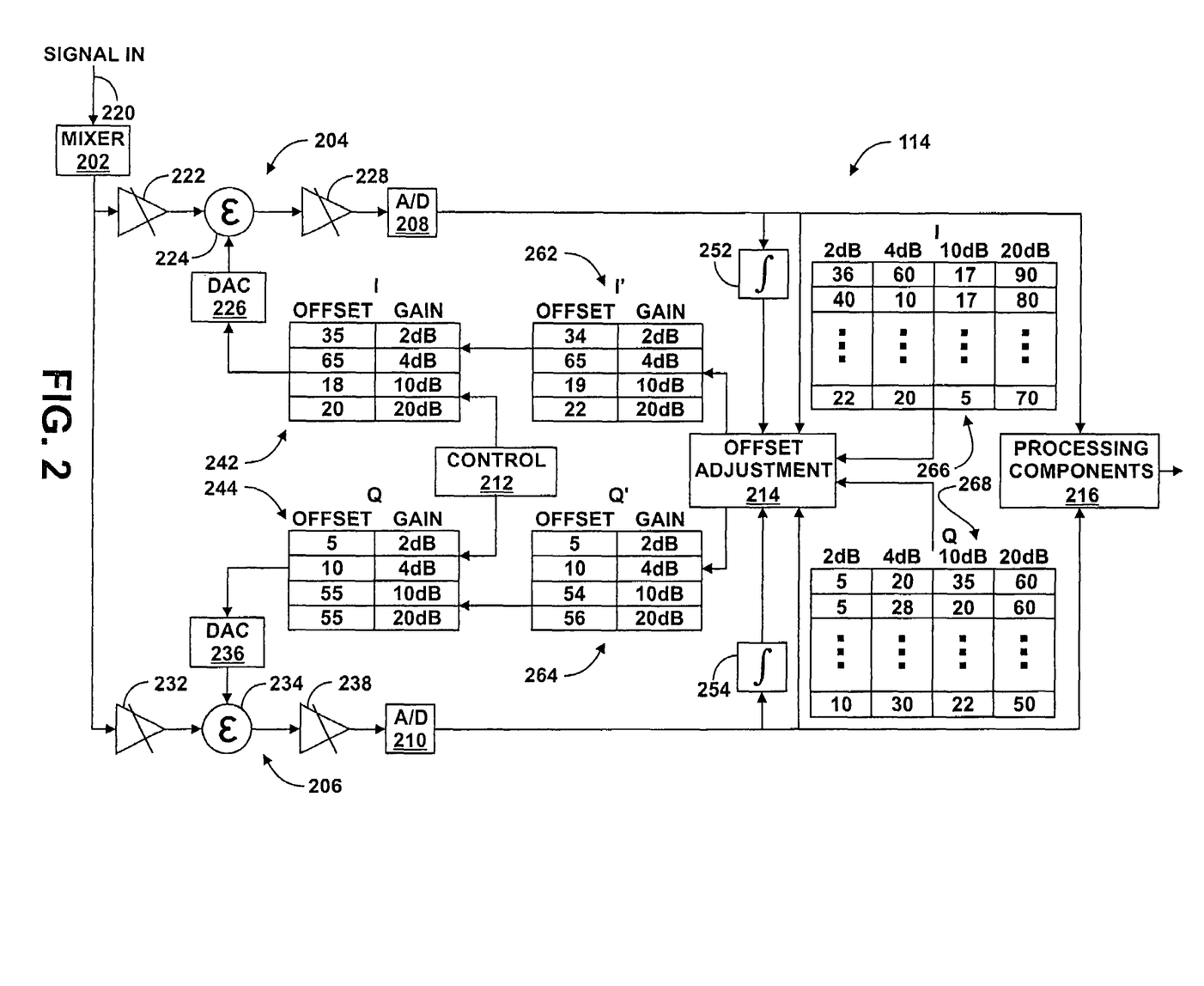
FIG. 2 is a block diagram of the physical (PHY) level of an exemplary wireless transceiver in accordance with at least one embodiment of the present disclosure.
Figure 3:
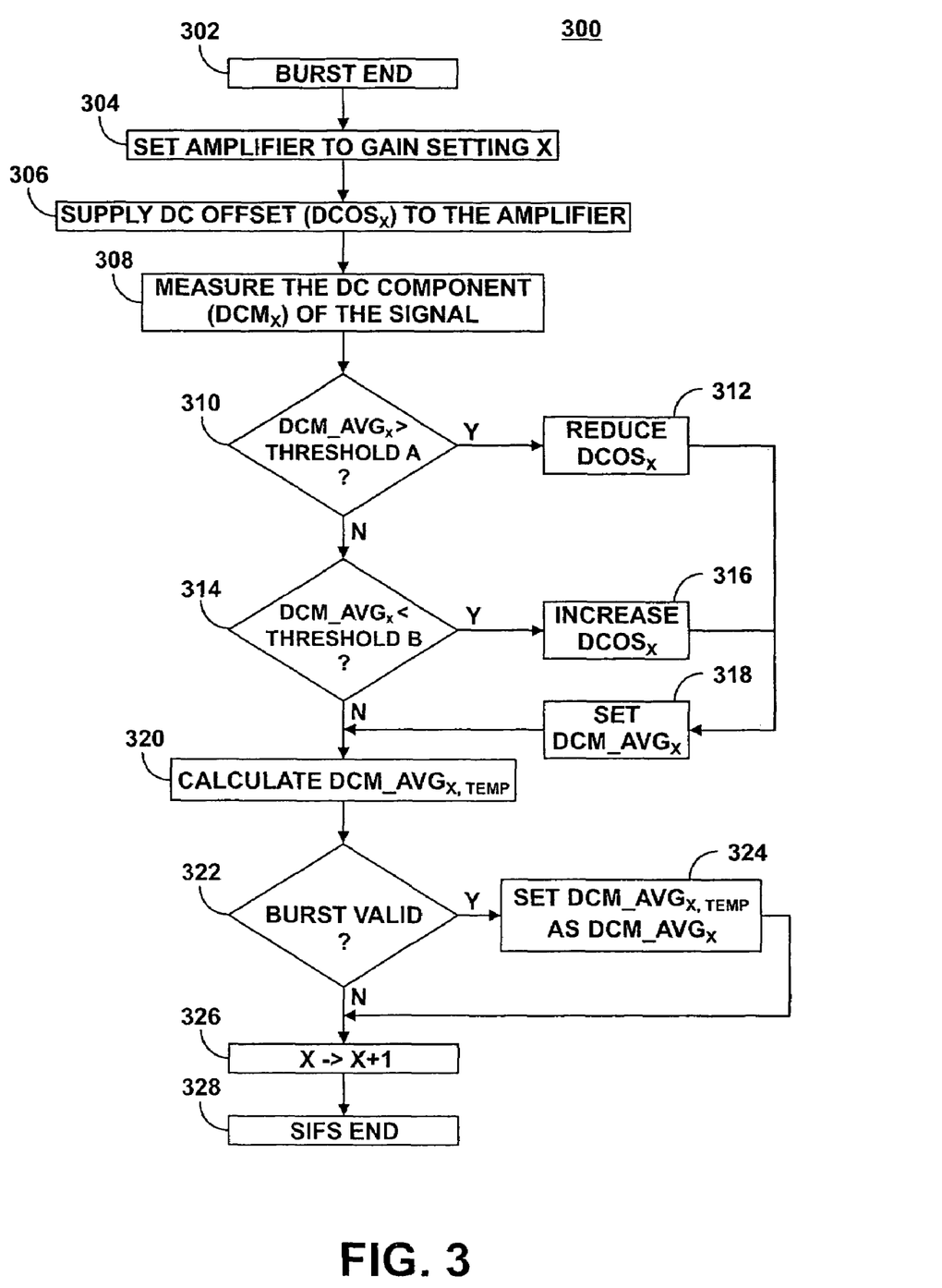
FIG. 3 is a block diagram illustrating an exemplary operation of the wireless transceiver of FIG. 2 in accordance with at least one embodiment of the present disclosure.

FIGS. 1-3 illustrate exemplary techniques for adaptive DC offset compensation in wireless systems. In at least one embodiment, the idle period (e.g., a short interframe spacing (SIFS) interval) following a transmission burst is utilized to measure the current DC component present in a received signal for a given gain setting. The average DC component is compared with one or more thresholds. If the average DC component exceeds a threshold (e.g., falls above an upper threshold or falls below a lower threshold) associated with the given gain setting, a DC offset used to compensate for the DC component is adjusted up or down accordingly. This process may be cycled between multiple gain settings. For example, during a first idle period, the DC component for a first gain setting may be determined and the DC offset used for the first gain setting may be adjusted accordingly. During the next idle period, the DC component for a second gain setting may be determined and the DC offset used for the second gain setting may be adjusted accordingly. This process may continue and cycle through some or all of the gain settings.

Referring now to FIG. 1, an exemplary wireless system 100 utilizing one or more adaptive DC component compensation techniques is illustrated in accordance with at least one embodiment of the present disclosure. For ease of discussion, the system 100 is discussed in the context of the delivery of multimedia information, such as MPEG-encoded audio and video (A/V) data. However, it will be appreciated that the illustrated system 100 may be utilized for the transmission of any of a variety of information types without departing from the spirit or the scope of the present disclosure.

In the illustrated example, the system 100 includes a transmitting device 102 and a receiving device 104, wherein the transmitting device 102 transmits information represented by one or more wireless signals to the receiving device 104. It will be appreciated that the receiving device 104 may also be a transmitting device and the transmitting device 102 may also be a receiving device. The transmitting device 102 includes, for example, an A/V encoder 106 (e.g., an MPEG encoder or transcoder) coupled to receive an A/V feed 108 (e.g., a DVD player, a cable head-in, a set top box, etc.). The resulting encoded/transcoded multimedia data is supplied to an RF transceiver 110, whereupon it is formatted for transmission as, for example, wireless signal 112. The receiving device 104 includes an RF transceiver 114 to receive the wireless signal 112 and process it to obtain the information (e.g., the encoded MPEG data) represented by the wireless signal 112. The resulting encoded MPEG data may be stored in a buffer 116 and an A/V decoder 118 (e.g., an MPEG decoder or transcoder) may obtain the encoded MPEG data from the buffer 116, decode the MPEG data, and provide the resulting decoded multimedia data as an A/V feed 120.

In at least one embodiment, the RF transceiver 114 of the receiving device 104 implements an adaptive DC offset compensation technique whereby the DC offsets employed for various gain settings of one or more amplifiers of the RF transceiver 114 are adjusted in a periodic or quasi-periodic manner so as to compensate for changes in the DC component of the wireless signal 112 that may result from, for example, changes in the transmission environment or changes in the operating characteristics of the components of the RF transceiver 114.

The wireless signal 112 typically comprises a series of transmission bursts and subsequent idle periods. To illustrate, a portion of the wireless signal 112 may comprise transmission bursts 122, 124 and 126, followed by idle periods 128, 130 and 132, respectively. Following each transmission burst, the RF transceiver 114 may determine the DC component present during the subsequent idle period for a selected gain setting. A DC component of the signal 112 for a particular gain setting is measured over multiple burst/idle periods to obtain multiple measured DC component values. To obtain the multiple measurements for a particular gain setting, the gain settings may be alternated between burst/idle periods (e.g., the DC component present for a first gain setting may be measured for one burst/idle period and the DC component present for a second gain setting may be measured for the next burst/idle period) or the DC component for a single gain setting may be measured over multiple adjacent burst/idle periods (e.g., the DC component present for a first gain setting is measured for two adjacent burst/idle periods).

As represented by block 140, the measured DC components are filtered for each gain setting to determine a DC component running average for each gain setting. The average DC component for a given gain setting may be determined using, for example, a moving average technique or leaky bucket technique for some or all of the measured DC components for the gain setting. To illustrate, assuming a three-value sliding window, three measured DC components ($DCM_X$, $DCM_{X+1}$, and $DCM_{X+2}$) determined for a given gain setting during idle periods 128, 130 and 132, respectively, may be averaged to produce the running average DC component for the given gain setting.

As represented by block 142, the average measured DC component for a given gain setting may be used to determine whether to adjust the DC offset used by the given gain setting to compensate for DC components when the given gain setting is used. In one embodiment, this determination is made based on a comparison of the average measured DC component to one or more thresholds. In the event that a threshold is exceeded, the RF transceiver 114 is adjusted to so that the DC offset used for the given gain setting is modified accordingly.

Referring now to FIGS. 2 and 3, an exemplary implementation of the PHY level of the RF transceiver 114 and an exemplary operation of the PHY level of the RF transceiver 114 are illustrated in accordance with at least one embodiment of the present disclosure. As depicted in FIG. 2, the transceiver 114 includes a mixer 202, amplifiers 204 and 206, analog-to-digital (A/D) converters 208 and 210, an amplifier control module 212 (e.g., an automatic gain control (AGC)-type controller), an offset adjustment module 214 and one or more processing components 216. In the illustrated example, amplifier 204 amplifies the real (in-phase) component of a received signal 220 and the amplifier 206 amplifies the imaginary (quadrature) component of the received signal 220. The amplifier 204 includes amplifier modules 222, 228 and summer 224. The amplifier module 222 has an input connected to the mixer 202 and an output connected to an input of the summer 224. The summer 224 has another input connected to the output of a digital-to-analog converter (DAC) 226. The output of the summer 224 is connected to the input of the amplifier module 228, which has an output coupled to the input of the A/D converter 208 via, for example, one or more filtering components (not shown). The amplifier 206 includes amplifier modules 232, 238 and summer 234. The amplifier module 232 has an input coupled to the output of the mixer 202 and an output coupled to an input of the summer 234. The summer 234 has another input coupled to the output of a DAC 236 and an output coupled to the input of the amplifier module 238. The output of the amplifier module 238 is coupled to the input of the A/D converter 210. Although the amplifiers 204 and 206 are illustrated as two-stage amplifiers for ease of reference, the amplifiers 204 and 206 may include more or fewer stages as appropriate.

In operation, the mixer 202 provides the real component of the received signal 220 to the amplifier 204 and the imaginary component of the received signal 220 to the amplifier 206. The real and imaginary components are amplified and adjusted to compensate for any DC component present. The resulting amplified and adjusted signals are converted to digital values by the A/D converters 210 and the digital values may be provided to the processing components 216 of the transceiver 114 for further processing as appropriate. The output of the processing components 216 may be processed at additional layers of the transceiver 114 (e.g., the media access control (MAC) layer, the link layer, etc.). As the processing of the real component and the processing of the imaginary component typically are substantially similar, only the processing of the real component of the received signal 220 is described in detail herein for ease of discussion. However, the described techniques are similarly applied to the processing of the imaginary component unless otherwise noted.

In the illustrated example, the received signal 220 is processed by the mixer 202 and the resulting real and imaginary components are provided to the amplifier module 222 and 232, respectively. The amplifier module 222 amplifies the signal in accordance with the particular gain setting and the amplified signal is provided to the summer 224, whereupon the amplified signal is adjusted by a DC offset provided from the DAC 226.

In at least one embodiment, the control module 212 maintains a gain setting table 242 (for the real component) and a gain setting table 244 (for the imaginary component). Each of the tables 242 and 244 may include, for example, an entry for a particular gain setting and a corresponding entry that stores a DC offset value representative of the DC offset to be implemented for the particular gain setting. To illustrate, the table 242 may include entries for each gain setting of 2 decibels (dB), 4 dB, 10 dB and 20 dB and the corresponding DC offset entries may have a value between, for example, 0 to 255, where a value of zero may correlate to a DC offset voltage of, for example, −500 millivolts (mV) and a value of 255 may correlate to a DC offset voltage of, for example, 500 mV. When the amplifier 204 is operating in a particular gain setting, the control module 212 indexes the entry for the gain setting used and provides the DC offset value stored in the corresponding entry to the DAC 226. The DAC 226 in turn converts this value to a voltage that is supplied to the summer 224 to offset the amplified signal output by the summer 222. For example, if the amplifier 204 is operating at the 20 dB gain setting, the control module 212 provides the value stored in the corresponding DC offset entry (a value of 20 in the illustrated example). The DAC 226 converts the value 20 to a voltage of, for example, −400 mV and the summer 224 accordingly adjusts the signal down by 400 mV. The adjusted signal then is amplified by the amplifier module 228 in accordance with the particular gain setting in use and the resulting amplified signal is converted to a digital value by the A/D converter 208.

Ideally, the DC offset provided by the DAC 226 for a particular gain setting in use has the same magnitude and opposite sign as the DC component present in the received signal 220 for the particular gain setting. However, as noted above, the DC component of the received signal 220 often varies due to any number of factors. Accordingly, the offset adjustment module 214 monitors the DC component of the received signal and adjusts the DC offsets of one or more of the gain settings as appropriate.

As illustrated, the offset adjustment module 214 may include inputs operably coupled to the outputs of the A/D converters 208 and 210 so as to monitor the amplified signals resulting from the operations of the amplifiers 204 and 206. As described above, in one embodiment, the offset adjustment module 214 measures the value of the signal during the idle periods following transmission bursts as the value of the amplified signal during the idle period typically is representative of the residual DC component of the amplified signal. In another embodiment, the transceiver 114 may include integrators 252 and 254 coupled to the outputs of the A/D converters 208 and 210, respectively, to determine the DC component of the amplified signal. In this instance, the integrators 252 and 254 may operate during transmission bursts, wherein the values output by the integrators 252 and 254 are representative of the DC component of the received signal 220 during the transmission bursts. Using measured values obtained from the integrators 252 and 254 or obtained from the outputs of the A/D converters 208 and 210 during idle periods, or a combination thereof, the offset adjustment module 214 may calculate a running average of the current measured DC component and previous measured DC component and use this running average DC component to determine whether adjustment of the DC offset introduced during the amplification stages is appropriate. In one embodiment, the offset adjustment module 214 makes the determination of whether to adjust the DC offset used for a given gain setting based on a comparison of the average measured DC component for the gain setting to one or more thresholds.

The offset adjustment module 214 may adjust the DC offset supplied to the amplifier 204 for a given gain setting by adjusting the corresponding DC offset value in the table 242. For example, if the DC offset value stored in an entry of the table 242 corresponding to the 2 dB gain setting is 35 and if the offset adjustment module 214 determines that the DC offset for the 2 dB gain setting needs to be increased based on the sign of the average measured DC component and because the magnitude of the average measured DC component for the 2 dB gain setting is above a certain threshold, the adjustment module 214 may increase the DC offset value stored in the corresponding entry to, for example, 36 (assuming that an increase in the DC offset value results in a less negative DC offset output by the DAC 226) so as to increase the DC offset supplied by the DAC 226 to the summer 224 when the amplifier 204 is operating in the 2 dB gain setting. Conversely, if the offset adjustment module 214 determines that the DC offset for the 2 dB gain setting needs to be decreased based on the sign of the average measured DC component and because the magnitude of the average measured DC component greater than a certain threshold, the offset adjustment module 214 may decrease the DC offset value stored in the corresponding entry to, for example, 34 (assuming that a decrease in the DC offset value results in a more negative DC offset output by the DAC 226) so as to decrease the DC offset supplied by the DAC 226 to the summer 224.

It will be appreciated that it may not be practical to directly update the tables 242 and 246 to change DC offset values stored by the tables 242 and 246. Accordingly, in at least one embodiment, the offset adjustment module 214 maintains shadow copies of the tables 242 and 244 (illustrated as shadow tables 262 and 264, respectively). Changes to one or more DC offset values may be made to the shadow tables 262 and 264 and, at the appropriate time, portions or all of the tables 242 and 246 may be overwritten by the corresponding portions of the shadow tables 262 and 264, respectively. The tables 242 and 246 typically are overwritten or updated with the information in the shadow tables 262 and 264 directly after the idle measurement periods of the signal 112.

As noted above, the offset adjustment module 214 maintains an average measured DC component for some or all of the gain settings. The average measured DC component for a gain setting may be determined as, for example, a moving average or leaky bucket on the most recent measured DC components, as an average or mean calculated from all or substantially all of the measured DC components, and the like. To facilitate the determination of the average measured DC component, the offset adjustment module 214 may maintain measured DC component tables 266 and 268 (corresponding to the amplifier 204 and 206, respectively) whereby the previous and current measured DC components may be stored for some or all of the gain settings. For example, if the average measured DC component is calculated using a sliding window technique, the tables 266 and 268 may include as many entries for each gain settings as the width of the window. Thus, the offset adjustment module 214 may calculate the average DC components for each gain setting simply by averaging the values stored in the tables 266 or 268 for the gain setting.

In certain instances, a perceived transmission burst may be invalid because the transmission burst was not a valid transmission burst (e.g., it was a burst of noise or static). The validity of a transmission burst may be determined from, for example, a cyclical redundancy check (CRC). Accordingly, the measured DC component obtained from an integration of the invalid transmission burst or from the expected idle period following the invalid burst typically is suspect. In such instances, the offset adjustment module 214 effectively discards the measured DC component upon notification that the transmission burst associated with the measured DC component was invalid. However, if a DC offset value in the table 242 or 262 has been changed as a result of a comparison of the current average measured DC component, in one embodiment, the offset adjustment module 214 sets the current average measured DC component to a predetermined value (e.g., zero).

FIG. 3 illustrates an exemplary operation 300 of the transceiver 114 depicted in FIG. 2 in accordance with at least one embodiment of the present disclosure. The operation 300 initiates at step 302 wherein a transmission burst ends or is expected to end for the signal 220. At this point, the received signal 220 is expected to be in an idle period (i.e., a SIFS period). At step 304, the amplifier 204 is set to a particular gain setting (e.g., the 4 dB gain setting). At step 306, the DC offset value in the entry of the table 242 corresponding to the selected gain setting is supplied to the DAC 226, whereupon it is converted to the corresponding DC value and supplied as a DC offset to the summer 224. The amplified signal output by the amplifier module 222 is adjusted by the supplied DC offset and the adjusted amplified signal is amplified by the amplifier module 228. The A/D converter 208 outputs a digital value corresponding to the value of the amplified signal at the time of conversion by the A/D converter 208. At step 308, the offset adjustment module 214 receives this digital value as a measurement of the DC component of the signal 220.

At step 310, the current calculated average DC component DCM_Avg$_x$ is compared to an upper threshold (threshold A)(e.g., 500 mV). In the event that the upper threshold is exceeded, the offset adjustment module 214 adjusts the DC offset value stored in the table 242 (or table 262) at step 312 so as to result in a more negative DC offset output by the DAC 226 when supplied with the adjusted DC offset value. The adjustment of the DC offset value may be incremental (e.g., from 35 to 34), proportional to the degree by which the average measured DC component exceeds the upper threshold, and the like.

At step 314, the current average DC component DCM_Avg$_x$ is compared with a lower threshold (threshold B)(e.g., −500 mV). In the event that the lower threshold is exceeded, the offset adjustment module 214 adjusts the DC offset value stored in the table 242 (or table 262) at step 316 so as to result in a more positive DC offset output by the DAC 226 when supplied with the adjusted DC offset value. The DC offset value may be adjusted incrementally, proportionally, etc. In the event that the DC offset value is adjusted at either step 312 or 316, the current average DC component DC_Avg$_x$ is set to a predetermined value (e.g., zero).

At step 320, the offset adjustment module 214 filters the measured DC component obtained at step 308 by using the measured DC component and one or more previous measured DC components for the selected gain setting to calculate a temporary average measured DC component (DCM_Avg$_{X,temp}$). Typically, the temporary calculated average measured DC component is stored in a register until it is determined whether the burst is valid at step 322 (discussed below). At step 322, the offset adjustment module 214 determines whether the transmission burst that was perceived or expected to end at step 302 was a valid transmission burst. Typically, the validity of the transmission burst may be determined by an evaluation of its CRC. If the burst is valid, at step 324 the current average measured DC offset (DCM_Avg$_X$) is set to the temporary average measured DC offset (DCM_Avg$_{X,temp}$). If the burst is invalid, the temporary average measured DC offset is discarded or otherwise disregarded.

At step 326, the next gain setting is selected. The gain settings may be alternated between burst/idle periods on a round-robin basis or some gain settings may be updated more frequently than others. Moreover, the same gain setting may be used over multiple adjacent burst/idle periods. At step 328, the idle period terminates or is expected to terminate. Steps 302-328 may be repeated for the next burst/idle period for the next selected gain setting.

Other embodiments, uses, and advantages of the present disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
   determining, during a first expected idle period of a received signal, a first direct current (DC) component of a first amplified representation of the received signal at an output of an amplifier, wherein the amplifier is set to a first gain setting;
   determining, during a second expected idle period of the received signal, a second DC component of a second amplified representation of the received signal at the output of the amplifier, wherein the amplifier is set to the first gain setting;
   determining whether a transmission burst preceding the second idle period is a valid transmission burst;
   when the transmission burst is determined as valid:
      determining a first average DC component based at least in part on the first and second DC components; and
      adjusting a DC offset used by the amplifier when set to the first gain setting based on a comparison of the first average DC component to one or more threshold values; and
   when the transmission burst is determined as invalid:
      determining a second average DC component based at least in part on the first DC component but not the second DC component; and
      adjusting the DC offset used by the amplifier when set to the first gain setting based on a comparison of the second average DC component to one or more threshold values.

2. The method of claim 1, wherein determining the first average DC component includes determining a moving average using at least the first and second DC components.

3. The method of claim 1, wherein:
   when the transmission burst is determined as valid:
      adjusting the DC offset includes reducing the DC offset when the first average DC component is greater than a first threshold; and
      adjusting the DC offset includes increasing the DC offset when the first average DC component is less than a second threshold.

4. The method of claim 1, wherein adjusting the DC offset includes adjusting a value input to a digital-to-analog converter that outputs the DC offset used by the amplifier.

5. The method of claim 1, further comprising:
   determining, during a third expected idle period of the received signal, a third DC component of a third amplified representation of the received signal at the output of the amplifier, wherein the amplifier is set to the first gain setting;
   determining a third average DC component based at least in part on the third DC component and at least one of the first and second DC components; and
   adjusting the DC offset used by the amplifier when set to the first gain setting based on a comparison of the third average DC component to one or more threshold values.

6. The method of claim 1, wherein:
   when the transmission burst is determined as invalid:
      adjusting the DC offset includes reducing the DC offset when the second average DC component is greater than a first threshold; and
      adjusting the DC offset includes increasing the DC offset when the second average DC component is less than a second threshold.

7. A system comprising:
   a variable gain amplifier having a first input to receive a first signal, a second input to receive a DC offset and an output to provide a second signal, the second signal including an amplified representation of the first signal having an adjustment based on the DC offset;
   a first table having an entry for each of a set of gain settings of the amplifier, each entry to store a value representative of a DC offset provided to the second input of the amplifier when the amplifier is set to the corresponding gain setting; and an offset adjustment module operably coupled to the second input and the output of the amplifier and to the first table, wherein the offset adjustment module is operable to, for each of one or more gain settings:
    determine an average DC component of the second signal for the gain setting by:
        determining, during a first period of the second signal, a first DC component, wherein the amplifier is set to the first gain setting;
        determining whether a first transmission burst during the second period is a valid transmission burst;
        in response to determining the first transmission burst as valid:
            determining, during a second period of the received signal, a second DC component, wherein the amplifier is set to the first gain setting; and
            determining the average DC component based at least in part on the first and second DC components; and
        in response to determining the first transmission burst as invalid:
            determining the average DC component exclusive of the second DC component; and
            adjusting the value representative of a DC offset stored in the entry of the first table corresponding to the gain setting based on a comparison of the average DC component to one or more thresholds.

8. The system of claim 7, wherein the offset adjustment module is operable to determine the average DC component based on a moving average.

9. The system of claim 7, wherein:
the offset adjustment module adjusts the value representative of a DC offset to represent a decreased DC offset when the average DC component is greater than a first threshold; and
the offset adjustment module adjusts the value representative of a DC offset to represent an increased DC offset when the DC component is less than a second threshold.

10. The system of claim 7, further comprising a digital-to-analog converter having an input to receive a value representative of a DC offset from the first table and an output to provide a DC voltage substantially equivalent to the DC offset to the second input of the amplifier.

11. The system of claim 7, wherein the first period includes a first expected idle period following a second transmission burst and the second period includes a second expected idle period following the first transmission burst.

12. The system of claim 7, farther comprising an integrator having an input operably coupled to the output of the amplifier and an output operably coupled to the offset adjustment module, wherein the integrator is adapted to output a value representative of the first DC component over the first period and a value representative of the second DC component over the second period.

13. The system of claim 7, wherein the first and second periods comprise at least one of: first and second transmission bursts or first and second expected idle periods.

14. A method comprising:
determining a first average direct current (DC) component for an amplified representation of a first signal, the first average DC component based on a measured DC component for the amplified representation of the first signal obtained during one or more periods of the first signal;
determining whether a first measured DC component is valid based on a validity of a transmission burst that precedes a period during which the first measured DC component is determined;
when the first measured DC component is determined to be valid:
    adjusting a DC offset supplied to an amplifier used to provide the amplified representation of the first signal based on a comparison of the first average DC component to one or more thresholds; and
when the first measured DC component is determined to be invalid:
    determining a second average DC component exclusive of the first measured DC component; and
    adjusting a DC offset supplied to an amplifier used to provide the amplified representation of the first signal based on a comparison of the second average DC component to one or more thresholds.

15. The method of claim 14, wherein the one or more periods comprise at least one of a transmission burst or an expected idle period.

16. The method of claim 14, wherein determining the first average DC component includes determining a moving average.

* * * * *

UNITED STATES PATENT AND TRADEMARK OFFICE
CERTIFICATE OF CORRECTION

PATENT NO. : 7,400,869 B2  Page 1 of 1
APPLICATION NO. : 11/086869
DATED : July 15, 2008
INVENTOR(S) : Paul M. Astrachan It is certified that error appears in the above-identified patent and that said Letters Patent is hereby corrected as shown below:

In column 10, line 5, claim 12 please replace "farther" with --further--.

Signed and Sealed this

Fourth Day of November, 2008

JON W. DUDAS
*Director of the United States Patent and Trademark Office*